_United States Patent Office_

3,287,317
Patented Nov. 22, 1966

3,287,317
PROCESS FOR MANUFACTURING PHENOLIC RESINS
Moïse Lerer, Paris, France, assignor to Institut Francais du Petrole, des Carburants et Lubrifiants, Rueil-Malmaison, Seine-et-Oise, France
No Drawing. Filed Dec. 4, 1961, Ser. No. 156,959
Claims priority, application France, Dec. 6, 1960, 846,378; Mar. 8, 1961, 855,147
5 Claims. (Cl. 260—57)

This invention relates to the preparation of novel phenolic resins, based on the heavy residues resulting from the condensation of olefins with formaldehyde.

One of the most advantageous processes known in the art for manufacturing conjugated diolefins comprises condensing monoolefins containing at least 3 carbon atoms with formaldehyde in the presence of catalysts such as, for instance, acids or salts. This condensation leads to the formation of substituted metadioxanes which may be subsequently decomposed to diolefins, said metadioxanes resulting from the condensation of one mole of monoolefin with two moles of formaldehyde.

The foregoing process may be carried out in two successive steps, each step corresponding to a separate type of conversion. The first step, conducted at a moderate temperature, e.g. lower than 120° C., in the presence of catalysts such as dilute sulfuric or phosphoric acids, leads to the formation of substituted metadioxanes. These substituted metadioxanes are decomposed during the second step at higher temperatures, for instance, about 200° C.–400° C., in the vapor phase, in the presence of dehydrating catalysts such as phosphoric acid or phosphates, preferably deposited on a support and, for instance, calcium or boron phosphate.

Alternatively, this process may also be conducted in a single step leading directly to the production of the diolefin, the metadioxanes formed intermediately being decomposed in the reaction medium as they are formed. In the case of such a single step process, the reaction temperature used is generally about 200° C.–400° C., and the catalysts employed are dehydrating catalysts for vapor phase operation, such as those catalysts described in the preceding paragraph.

In a two-step process, the substituted metadioxanes are obtained at the end of the first step as the main reaction product and are separated from the reaction mixture prior to their conversion, which is carried out subsequently in the second step. For additional details concerning the production of alkylmetadioxanes, attention is invited to U.S. Patents 2,962,507 and 2,997,480.

After said separation of metadioxanes, the remaining part of the reaction medium of said first step, consisting of by-products formed during said step as a result of side reactions, comprises a residue of apparent low industrial value.

Such a type of apparently valueless residue is also obtained at the end of the second step of converting the metadioxanes to diolefins, or at the end of the single-step process, after removal of the formed diolefin and of a certain amount of unconverted substituted metadioxanes which are recovered, for instance, by distillation.

For example, in the case of manufacturing isoprene, which is one of the most interesting diolefins obtainable advantageously on an industrial scale by condensation of a monoolefin (isobutene) with formaldehyde, the heavy residues consist of products having a boiling point higher than that of 4,4-dimethylmetadioxane which is formed as the intermediate product, i.e. higher than about 133° C. under atmospheric pressure. Also, there are three possible heavy residues, depending on the particular process that is employed, one-step or two-step, and the step from which the heavy residues are taken.

The so-defined residues having a boiling temperature higher than that of the substituted metadioxanes will be designated hereinafter by the term "heavy residues." This term covers both the total quantity and any portion of reaction products of lower volatility than the intermediate substituted-metadioxane which "heavy residues" may be isolated for instance by fractional distillation and/or extraction with aqueous or organic solvents.

Even when, in processes of this type, the heavy residues are present in only small amounts in the reaction mixture, it is still of considerable advantage to convert them to valuable products, since such a conversion results in a lowering of the overall cost of the conjugated diolefins.

The method of producing and the properties of the heavy residues which are the subject of the present invention are well known in the prior art. In this connection, reference is made to the article by A. Y. Giraud (Chemical Engineering Progress, vol. 57, No. 9, pp. 66–72, September 1961) which, in describing the said heavy residues, stresses the fact that they are composed of saturated compounds.

It is, therefore, an object of this invention to convert the heavy residues to valuable products.

It is another object of this invention to convert the heavy residues to complex phenolic resins hereinafter designated as type A-resins which may be used as such, or preferably, after neutralization and/or concentration, as thermosetting resins in the same manner as the so-called novolac resins, by reacting the novel phenolic resins with formaldehyde or hexamethylene-tetramine for example, to form cured resins.

It is still another object of this invention to recover valuable by-products from the reaction mixture resulting from the conversion of the heavy residues (particularly those produced during the first step of a two-step process for manufacturing conjugated diolefins) to complex formophenolic resins, said valuable by-products being conjugated diolefins or compounds which may be decomposed by a thermal or catalytic treatment to said diolefins, said decomposable compounds being, for instance, metadioxanes and pyrans.

It is yet another object of this invention to convert the heavy residues to complex phenolic resins hardening under the mere action of heat (hereinafter referred to as type B resins) which have the same uses as the resols, said resins resulting from the reaction of condensation of the heavy residues with phenols, conducted in the presence of aldehydes or aldehyde-generating substances, for example, in the presence of formaldehyde, paraformaldehyde or hexamethylenetetramine.

It is a further object of this invention to manufacture said type B resins in a two-step process, the first step leading to the formation of type A resins which are thereafter converted during the second step by treatment with the aforementioned aldehydes or with hexamethylenetetramine. The second step is preferably conducted after neutralization and concentration of the reaction mixture obtained at the end of the first step to avoid any undesired solidification of the product in the reaction vessel which could result from a neutralization and concentration of the reaction mixture obtained at the end of the second step.

It is still a further object of this invention to manufacture phenolic-polyesters interpolymers having improved properties as compared both to conventional resins of the polyester type and the conventional phenol-formaldehyde resins, particularly a higher hardness and resistance to impact and a better resistance to the action of water than resins of the polyester type and a better solubility in usual solvents than the phenol-formaldehyde resins.

Other objects and advantages of the present invention will become apparent upon further study of the specification and appended claims.

These objects are achieved according to the present invention by condensing the heavy residues with a phenol and if desired by reacting the resulting reaction product comprising complex phenolic resins with olefinic acids or their functional derivatives.

Any phenol of the type conventionally used for the manufacture of phenol-formaldehyde resins may be employed according to this invention. For instance, there may be used mono- or poly-phenols as such or comprising other substituents of the aromatic ring. By way of non-limitative examples there may be used, in particular, ordinary phenol, cresols, xylenols, butylphenols, amyphenols, benzylphenols, diphenylphenols, cyclohexylphenols, resorcinol, bis-phenols and the like, either alone or in combination.

The amount of phenol used, as compared to the amount of heavy residue treated may be selected over a wide range, for instance, from 0.1 to 5 times and preferably from 0.2 to 1.0 time the weight of the heavy residue.

Compounds of higher or lower degree of condensation will be obtained depending on the temperature conditions and the duration of the reaction. In most cases the temperature may be selected within the range of from 50 to 200° C. and preferably between 70 and 130° C.

The degree of completion of the reaction may be determined by subjecting samples of the reaction mixture to a hardening treatment by a mere heating of the same, for instance, to a temperature of 180–200° C. in the case of resins of type B, and, in the case of resins of the type A, by conducting said heating treatment at the same temperature, in the presence of formaldehyde or hexamethylenetetramine.

The reaction is preferably stopped as soon as said heating treatment results in a sufficiently rapid hardening of the reaction product.

To the mixture of the reactants (heavy residue and phenol) there may be added catalysts of the type conventionally used for condensing phenol with formaldehyde, which catalysts are generally selected in the group of acids and acid-acting salts, though the acidity of the heavy residues will in most cases suffice for generating the reaction.

By way of non-limitative examples, the following catalysts may be used either alone or in combination; sulfuric acid, phosphoric acid, toluene-sulfonic acid, boron fluoride, aluminum chloride, zinc chloride, antimony pentachloride and ferric chloride.

There may also be added to the reaction mixture, either at the beginning or during the course of the reaction, other compounds which, by reaction with the phenols contained in the reaction mixture, lead, in combination with the heavy residues, to the formation of resins exhibiting new properties such as, for instance, an improved flexibility.

Such compounds may be selected particularly in the group consisting essentially of unsaturated alcohols, ketones, polyhydric alcohols, for instance, sugars, cellulose, starch, alkyl-, aryl- or alkylaryl-halogenides, dioxolanes, metadioxanes or other substituted derivatives thereof, the substituents of which correspond to other functional groups.

The reaction may be conducted either in the absence or in the presence of water. In the latter case it would be advantageous to dissolve or suspend the catalyst in water.

The volatile compounds eventually formed, may be separated from the reaction mixture as the reaction proceeds and/or at the end of the reaction. There may thus be recovered, conjugated diolefins, metadioxanes, dihydropyrans, etc. In the particular case where the heavy residue is that obtained from the reaction between formaldehyde and isobutene there will be recovered in particular isoprene, 4,4-dimethylmetadioxane, 4-methyl-5,6-dihydro-(2H)-pyran, etc.

At the end of this operation after neutralization and concentration, the resulting reaction products may either by employed as such for the same uses as the phenolic resins or may be converted, by means of the above mentioned esterifying treatment, to composite phenolic-polyester resins.

However, the manufacture of such composite resins may be also conducted in a single step consisting of directly subjecting to said esterifying treatment a mixture of the heavy residue with the selected phenol and esterifying agent.

In both cases, i.e. when the process is carried out in a single step as well as in two-steps, the esterification is realized by adding, either to the complex phenolic resin or to the mixture of phenol with the heavy residue, an olefinic acid or a functional derivative thereof, and if advisable, by heating the resulting mixture to a temperature sufficient for a satisfactory reaction rate.

By functional derivative of an olefinic acid, is meant, according to this invention, any carbonylated or carboxylated compound usable in lieu of said acid for conducting an esterification reaction, for example, an acid anhydride, an acid chloride, an ester of an alcohol or of a polyalcohol of low molecular weight, an amide or imide, etc., said list being obviously non-limitative.

The acids used, either as such as admixed together, may be either of the monoacid type such as oleic, linoleic, or ricinoleic acids, or of the polyacid type such as, for instance, maleic acid or fumaric acid. Whatever their type, they may be either acyclic or cyclic, which is particularly the case for rosin and acids contained therein.

The esterification may be conducted in the presence of an inert solvent and/or conventional esterifying catalyst such as, for instance, a strong acid or an acid-acting salt. The conditions for conducting esterifying reactions are well known in the art and described for instance in Encyclopedia of Chemical Technology 5, 776–814 (1950) by Kirk and Othmer, Interscience Publishers. In particular, the aforementioned phenolic-polyester mixed resins may be co-polymerized with other compounds, such as styrene, allylterephthalate, allyl and ethylene glycol carbonate, etc.

For all of these applications the best results are obtained by treatment of the heavy residues produced in the first step of the two-step process of manufacturing isoprene.

According to another embodiment of the process of this invention the phenols are reacted with the heavy residues in the absence of water, the water formed during the reaction being removed from the reaction mixture. The resulting residue exhibits a better solubility in hydrocarbons, particularly in aromatic hydrocarbons, than the complex phenolic resin obtained when the reaction is conducted according to the general aforementioned conditions, and it also possesses good drying oil properties. Both of these properties are of considerable interest for the use of said resins as a raw material component for the manufacture of paints and varnishes in replacement of usual drying oils such as linseed oil. Generally, said resin, in view of these improved properties have the same field of applicability as the usual drying oils.

The removal of water from the reaction medium according to the last-mentioned embodiment of the process of the invention may be effected by distillation, eventually under reduced pressure or, preferably, by azeotropic dehydration of the reaction mixture, conducted preferably by heating the latter in admixture with a compound forming an heteroazeotropic mixture with water, such as benzene or toluene. The water may also be absorbed by means of a conventional dehydrating agent such as calcium sulfate, calcium chloride, etc. introduced into the reaction mixture.

In view of the required removal of water according to the last embodiment of the process of this invention, it is preferred to use reactants, solvents and/or catalysts the water content of which is as low as possible and to conduct the reaction in the presence of a solvent which may facilitate the removal of the water such as benzene, toluene, xylene or any other analogous solvent forming an azeotropic mixture with water, such solvents being preferably selected from the group of the solvents employed in conjunction with the product of its final use. For instance, when the final use of the resin is that of a component for paints and varnishes, the hydrocarbons, particularly of the aromatic type, would be advantageously selected as solvents both for technical and economical reasons.

The reaction product may be used as such or in some cases, after removal of the solvent, the catalyst or the dehydrating agent which may have been employed, said removal being effected by extraction, distillation, neutralization, decomposition or by any other convenient way.

The following preferred specific embodiments are not to be considered in any way as limitative of the scope of the present invention, and are given for illustrative purposes only.

In these examples, the hydroxyl number has been determined by acetylation of one gram of the product with an excess of acetic anhydride in pyridine, followed by the hydrolysis of the unconverted acetic anhydride and the determination by means of potash of the amount of the so-liberated acetic acid. Accordingly, the hydroxyl number will hereinafter designate the number of milligrams of potash corresponding to the acetic acid combined in the form of ester.

EXAMPLE 1

In a 3-liter flask there is heated to reflux for 6½ hours, a mixture of:

470 g. of phenol
500 ml. of a 0.1 N sulfuric acid aqueous solution and 1,000 g. of a heavy residue having a hydroxyl number of 113 obtained by distilling 4,4-dimethylmetadioxane from the reaction mixture resulting from the reaction of condensing formaldehyde with isobutene in the presence of a 15% by weight sulfuric acid solution, at a temperature of about 70° C.

The resulting mixture is then neutralized by means of an aqueous solution of soda and concentrated at a temperature not in excess of 100° C., first under ordinary pressure and thereafter under a reduced pressure of 20 mm./Hg absolute.

There remains in the flask 1,320 g. of a viscous liquid having a hydroxyl number equal to 430, consisting of a complex phenolic resin. Said resin has accordingly similar applications as novolac resins. For example, this resin may be converted to an insoluble resin by heating, in the presence of formaldehyde or hexamethylenetetramine, for instance, by heating 20 g. of the preceding phenolic resin in admixture with 2 g. of hexamethylenetetramine at a temperature of 150° C. for two hours, there is obtained a hard infusible resin.

EXAMPLE 2

20 g. of the complex resin as obtained according to Example 1 is dissolved in ethyl alcohol. Into the resulting solution are introduced 20 g. of wood flour and the resulting mixture is stirred up so as to obtain an homogeneous mass. The alcohol is then removed by evaporation and 2 g. of powdered hexamethylenetetramine are admixed with the resinous mass. The resulting mass is compressed between two plates and heated to 130° C. for two hours. There is thus obtained a very hard and resistant cured mass.

EXAMPLE 3

100 g. of the viscous liquid as obtained according to Example 1, in admixture with 37.5 g. of maleic anhydride are heated to 145° C. for one hour. The resulting product, amounting to 135 g., exhibits a high viscosity at the reaction temperature and solidifies upon cooling. Its acid index (measured by the potash amount in milligrams required for neutralizing 1 g. of the product) is equal to 160.

EXAMPLE 4

In a 3-liter flask provided with a reflux condenser, there are refluxed for two hours:

1,000 g. of the same heavy residue as that used in Example 1,
300 g. of maleic anhydride,
620 g. of phenol.

An ordinary condenser is then adapted to the flask and the reaction product is concentrated by gradual heating to 200° C. under atmospheric pressure.

There are thus obtained 265 g. of distillate and 1,655 g. of a resin which is viscous at 200° C. and solidifies upon cooling. said resin has the same field of applicability as the resin obtained according to Example 3.

EXAMPLE 5

In a 3-liter distillation flask are introduced 310 g. of phenol, 600 g. of toluene and 1 kg. of concentrated sulfuric acid ($d=1.83$). After dissolution of the mixture, there is added thereto 1 kg. of heavy residue obtained in a process for manufacturing 4,4-dimethylmetadioxane by reacting formaldehyde with isobutene in the presence of a 15% sulfuric acid solution at a temperature of 70° C.

The resulting reaction mixture is then maintained at its distillation temperature, of about 125–135° C. for ten hours. The distilled vapors are condensed, and after water is removed therefrom, the toluene is recycled to the flask. At the end of the run, the contents of the flask are neutralized with calcium carbonate; the solid phase is separated by centrifugation from the liquid phase; and the latter is then concentrated under a progressively decreasing pressure, down to 2 mm./Hg absolute, without exceeding the maximum temperature of 102° C.

There are thus obtained 1,160 g. of a complex phenolic resin. By dissolving 10 g. of said resin and 0.2 g. of cobalt octanoate in 10 g. of toluene, there is obtained a fluid varnish which, applied on such materials as wood or metals, results, after drying in the air, in the formation of a protective coating consisting of a bright, dry and hard film exhibiting a good resistance to the action of water and of the usual solvents. By incorporating pigments in said varnish, paints are obtained.

By heating 10 g. of said complex phenolic resin with 1 g. of hexamethylenetetramine for 1 hour at a temperature of 150° C. there is obtained a hard infusible resin.

By heating 40 g. of said complex phenolic resin with 10 g. of styrene and 0.5 g. of cobalt octanoate having a 6% by weight cobalt content, there is also obtained a solid resin.

EXAMPLE 6

In a 3-liter distillation flask, there is heated to reflux for one hour-45 minutes, at a temperature of about 92° C., a mixture of 1 kg. of the same heavy residue as treated in Example 5, 310 g. of phenol, 20 g. of sulfuric acid ($d=1.83$) and 600 g. of benzene.

The process is conducted in the same manner as according to Example 5, and there are obtained 980 g. of a complex phenolic resin. Said resin may be subjected to the same reactions as those applied to the resin of Example 5.

EXAMPLE 7

A mixture of 310 g. of phenol and 5 g. of 96% sulfuric acid are heated up to the complete melting of the phenol. Into said mixture are introduced progressively in twelve minutes 1 kg. of the same heavy residue as treated according to Example 1, the temperature being maintained below 125° C. The mixture is then heated to reflux for one hour and thereafter are added thereto: 2 g. of ethylenediamine to adjust the pH to a value of about 4.5, and 20 g. of paraformaldehyde. The resulting mixture is heated for one hour to 100° C., and thereafter concentrated at the same temperature by progressively reducing the pressure down to 20 mm./Hg absolute. There are thus obtained 1,200 g. of a thermosetting resin which can be cured, for instance, at a temperature of about 180° C.

EXAMPLE 8

The first part of Example 7, up to the step of neutralization by means of ethylenediamine inclusively, is repeated. After said neutralization step, the reaction mixture is concentrated at a temperature not in excess of 100° C. by progressively reducing the pressure down to 20 mm./Hg absolute. Twenty g. of formaldehyde are then added thereto and the resulting mixture maintained for about one hour to a temperature of 100° C. There are thus obtained 1,205 g. of a thermosetting resin, curable, for instance, at a temperature around 180° C.

EXAMPLE 9

A strip of unglazed paper (kraft paper) of a 4 cm. width is immersed into a 40% solution in ethanol of the resin obtained according to Example 8. The paper is then allowed to drain for fifteen minutes, and is thereafter dried by heating to 130° C. for ten minutes. Eighteen sheets of superinforced strips of said paper are then compressed between the two plates of a press. By heating the press to 170° C., there is so obtained a hard laminate, non-friable and insoluble in water as well as in usual organic solvents.

EXAMPLE 10

The heavy residue used in this example is obtained from the reaction mixture of the second step of a two-step process of manufacturing isoprene, specifically the step consisting of the decomposition in the vapor phase of 4,4-dimethylmetadioxane diluted with steam at a temperature of 280° C., in the presence of a catalyst consisting of phosphoric acid deposited on a quartz support. Said residue is obtained by distilling said decomposition products to yield a fraction having a boiling point higher than 135° C.

A mixture of 100 g. of said heavy residue with 41.2 g. of phenol and 1 g. of concentrated sulfuric acid ($d=1.83$) is heated to reflux for seven hours at a temperature between 98 and 110° C. The reaction mixture is then neutralized by adding thereto 0.9 g. of soda, and it is finally concentrated by distillation of the volatile products under a reduced pressure of 5 mm./Hg absolute, at a temperature of 100° C.

The resulting residue, amounting to 95.5 g. consists of a resin exhibiting good drying oil properties. Five g. of this resin, in admixture with 5 ml. of toluene and 0.1 ml. of cobalt octanoate, having a 6% cobalt content, constitutes a varnish which may be used for coating a glass plate, for instance. Said varnish, dried in the air after about thirty minutes at ambient temperature or after ten minutes at a temperature of 100° C., exhibits a good resistance to the action of water.

EXAMPLE 11

Into a mixture of 60 g. of phenol with 1 g. of sulfuric acid ($d=1.83$) maintained at a temperature of 90° C., is introduced progressively in 15 minutes and at a temperature not in excess of 120° C., a mixture of 50 g. of the same heavy residue as in Example 1 with 50 g. of methyl-3-butanediol-1,3. The resulting mixture is heated to reflux for eight hours at about 105° C. and thereafter neutralized by means of 0.75 g. of ethylenediamine, so that the pH attains a value of 5. The mixture is then concentrated by distilling the volatile products at about 100° C., said distillation being furthered under a reduced pressure of 20 mm./Hg absolute. There remains 125 g. of a semi-fluid resin in the distillation flask.

A glass fiber is impregnated with a mixture of 100 g. of said resin with 10 g. of hexamethylenetetramine. By heating the impregnated glass fiber under pressure there is obtained a hard and infusible mass.

The resinous materials produced in accordance with this invention, can be employed as the drying oil or resinous material in paints and varnishes. Consequently, a paint composition can comprise one or more pigments and products of the heavy residues of this invention in conventional concentrations, such as 5 to 90% pigment and 5 to 70% heavy residue based on the total weight of the paint composition.

With respect to varnish-type coating materials, it is appreciated that these coating compositions comprise generally a volatile solvent and a drying oil or resinous material. Consequently, a varnish maker can employ the resinous materials of this invention in conventional amounts, such as 5 to 100% by weight of the total varnish composition, and preferably 10 to 95%.

The resinous materials of this invention can also be employed in molding compositions along with the other conventional agents, such as, fillers, pigments, etc. In general, based on 100 parts by weight the resinous materials can be employed in amounts of 5 to 99 parts, preferably 10 to 95 parts, the remaining ingredients being inert.

With respect to the olefinic acids that can be employed in the mixed phenol-ester resins, it is preferred to employ acids having from 3 to 24 carbon atoms, preferably 4 to 18. The preferred ratio of esterifying agent to phenolic agent is about 5% to 500% by weight, preferably 10 to 100%, depending upon the desired properties of the ultimate polymer.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably and intended to be within the full range of equivalence of the following claims.

What is claimed is:

1. A process for manufacturing phenolic resins, which process comprises reacting phenols with saturated heavy residue products boiling above about 133° C. under atmospheric pressure obtained by reacting isobutene with formaldehyde in the presence of an acid catalyst and at a temperature lower than 120° C., said process being carried out at a temperature between about 50 and about 200° C.

2. The process of claim 1, wherein said reaction is conducted in the presence of a member from the group consisting of an aldehyde and hexamethylene tetramine.

3. The process of claim 1, wherein the reaction is conducted at 70°–130° C.

4. The process of claim 1, wherein any water formed during the reaction of the phenol and saturated heavy residue is removed during the reaction.

5. The process of claim 1, wherein the process is conducted in the presence of a catalyst selected from the group consisting of acids and acid-acting salts.

References Cited by the Examiner

UNITED STATES PATENTS

| | | | |
|---|---|---|---|
| 2,856,412 | 10/1958 | Wheeler | 260—340.7 |
| 2,915,500 | 12/1959 | Wilson et al. | 260—47 |
| 3,000,905 | 9/1961 | Wheeler et al. | 260—340.7 |
| 3,012,988 | 12/1961 | Guest et al. | 260—47 |
| 3,041,298 | 6/1962 | Berglund et al. | 260—19 |

FOREIGN PATENTS 1,314,373  12/1962  France.

OTHER REFERENCES

Chemical Engineering Progress, vol. 57, September 1961, pp. 66–72.

WILLIAM H. SHORT, *Primary Examiner.*

PHILLIP E. MANGAN, LOUISE P. QUAST,
*Examiners.*

A. D. RICCI, H. SCHAIN, *Assistant Examiners.*